United States Patent
Tanaka

(10) Patent No.: US 9,611,770 B2
(45) Date of Patent: Apr. 4, 2017

(54) EXHAUST PIPE STRUCTURE FOR VEHICLE

(71) Applicant: SUZUKI MOTOR CORPORATION, Hamamatsu-shi, Shizuoka (JP)

(72) Inventor: Koichi Tanaka, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 0 days.

(21) Appl. No.: 14/778,557

(22) PCT Filed: May 18, 2015

(86) PCT No.: PCT/JP2015/064216
§ 371 (c)(1),
(2) Date: Sep. 18, 2015

(87) PCT Pub. No.: WO2015/182426
PCT Pub. Date: Dec. 3, 2015

(65) Prior Publication Data
US 2016/0290195 A1 Oct. 6, 2016

(30) Foreign Application Priority Data
May 28, 2014 (JP) ................. 2014-110275

(51) Int. Cl.
*F01N 1/08* (2006.01)
*B62M 7/02* (2006.01)
(Continued)

(52) U.S. Cl.
CPC .............. *F01N 1/083* (2013.01); *B62K 11/04* (2013.01); *B62M 7/02* (2013.01); *F01N 1/084* (2013.01);
(Continued)

(58) Field of Classification Search
CPC ...... F01N 1/083; F01N 13/08; F01N 2340/04; F01N 2590/04
(Continued)

(56) References Cited

U.S. PATENT DOCUMENTS 4,290,501 A * 9/1981 Tanaka .................... F01N 1/084
181/228
4,381,045 A * 4/1983 Buchwalder ............ F01N 1/084
181/265
(Continued)

FOREIGN PATENT DOCUMENTS

JP 3889236 B2 3/2007

*Primary Examiner* — Forrest M Phillips
(74) *Attorney, Agent, or Firm* — Stein IP, LLC

(57) ABSTRACT

It is possible to simplify an internal structure of a silencer and it is possible to improve silencing performance while suppressing the increase of the size of the silencer. An exhaust pipe structure is constituted by an exhaust pipe (45) which is connected to an engine (4), and a silencer (43) which is disposed under the engine. A silencer inlet (43*a*) through which exhaust gas is introduced into the silencer is provided in the silencer and at the rear of a vehicle body. The exhaust pipe has a rear portion reversal pipe (62) by which a direction of an exhaust stream flowing rearward is reversed into a frontward direction. A downstream end side of the rear portion reversal pipe is connected to the silencer inlet. A silencer outlet (43*b*) through which exhaust gas is discharged from the silencer is provided in the silencer. The silencer outlet is provided at the front of the vehicle body. Thus, exhaust gas can flow inside the silencer unidirectionally from the rear toward the front.

14 Claims, 10 Drawing Sheets

(51) Int. Cl.
  *F01N 13/08*  (2010.01)
  *B62K 11/04*  (2006.01)
  *F02B 61/02*  (2006.01)
(52) U.S. Cl.
  CPC .......... *F01N 13/08* (2013.01); *F01N 2340/04* (2013.01); *F01N 2590/04* (2013.01); *F02B 61/02* (2013.01)
(58) Field of Classification Search
  USPC ................................................ 181/228, 227
  See application file for complete search history.

(56) References Cited

U.S. PATENT DOCUMENTS

| | | | | |
|---|---|---|---|---|
| 4,840,030 | A * | 6/1989 | Ikeda ...................... | F01N 1/166 181/228 |
| 5,388,408 | A * | 2/1995 | Lawrence .............. | B60K 13/04 181/228 |
| 6,141,958 | A * | 11/2000 | Voss .......................... | F01N 3/02 138/177 |
| 6,247,305 | B1 * | 6/2001 | Bassani ................... | F02B 27/04 181/227 |
| 6,745,863 | B2 | 6/2004 | Tsukui et al. ................. | 180/309 |
| 7,650,965 | B2 * | 1/2010 | Thayer ...................... | F01N 1/02 181/212 |
| 2002/0153187 | A1 * | 10/2002 | Tsukui .................... | F01N 13/08 180/219 |

* cited by examiner

EXHAUST PIPE STRUCTURE FOR VEHICLE

CROSS-REFERENCE TO RELATED APPLICATIONS

This application is a national stage of International Application No. PCT/JP2015/064216, filed May 18, 2015, which claims the benefit of priority to Japanese Application No. 2014-110275, filed May 28, 2014, in the Japanese Patent Office, the disclosures of which are incorporated herein by reference.

TECHNICAL FIELD

The present invention relates to an exhaust pipe structure For a vehicle, in which a silencer is provided on a lower portion Of an engine.

BACKGROUND ART

In the background art, a structure in which exhaust gas of an engine is discharged through an exhaust pipe and a silencer has been used in a vehicle such as a motorcycle. Such a structure may include a type in which the exhaust pipe and the silencer are disposed under the engine in order to improve output characteristics or satisfy a request for external appearance of the vehicle, as disclosed in Patent Literature 1.

In the silencer in Patent Literature 1, both an inlet and an outlet for exhaust gas are provided at the rear of a vehicle body and the exhaust pipe extending from the engine is connected to the inlet. In addition, the silencer is formed into a cylindrical shape which is long and narrow in a front/rear direction. The inside of the silencer is divided into three expansion chambers in a longitudinal direction (front/rear direction). First to third communication pipes are arranged to be laid across the expansion chambers.

Specifically, the first communication pipe extends from the rear expansion chamber, passes through the inside of the center expansion chamber, and communicates with the front expansion chamber. The second communication pipe extends from the front expansion chamber and communicates with the center expansion chamber. The third communication pipe extends from the center expansion chamber, passes through the rear expansion chamber, and communicates with the exhaust gas outlet on its rear end side. In the silencer, exhaust noise is attenuated by an expansion effect when exhaust gas enters the respective expansion chambers. Accordingly, a silencing function can be fulfilled. Generally, silencing performance of the silencer is improved more greatly as the volume of each expansion chamber increases.

CITATION LIST

Patent Literature

Patent Literature 1: Japanese Patent No. 3889236

SUMMARY OF INVENTION

Problem to be Solved by the Invention

However, the flow of exhaust gas is reversed inside the front expansion chamber in the structure according to Patent Literature 1. Accordingly, the layout or structure of the three communication pipes inside the silencer becomes complicated. For this reason, there is a problem that the volume occupied by the communication pipes inside the silencer may increase to thereby decrease the silencing performance in comparison with the size of the silencer. Here, the silencing performance can be maintained if the size of the silencer is increased correspondingly to the volume of the communication pipes. However, in this case, there occur various problems due to the increase of the size, such as a problem that the weight of the silencer may increase.

The invention has been accomplished in consideration of the foregoing points. An object of the invention is to provide an exhaust pipe structure for a vehicle, in which an internal structure of a silencer can be simplified and silencing performance can be improved while the increase of the size of the silencer is suppressed.

Means for Solving the Problem

An exhaust pipe structure for a vehicle of the invention comprises: an exhaust pipe which is connected to an engine; and a silencer which is connected to the exhaust pipe and disposed under the engine; and a silencer inlet through which exhaust gas is introduced into the silencer is provided in the silencer and at the rear of a vehicle body; the exhaust pipe has a rear portion reversal pipe by which a direction of a flow of exhaust gas flowing rearward is reversed into a frontward direction, the exhaust pipe being connected to the silencer inlet at a downstream end side of the rear portion reversal pipe; and a silencer outlet through which exhaust gas is discharged from the silencer is provided in the silencer and at the front of the vehicle body.

According to the configuration, the silencer inlet is provided at the rear of the vehicle body. Accordingly, a long exhaust pipe extending from the engine to the silencer can be secured and output characteristics can be improved in comparison with the case in which the silencer inlet is provided at the front of the vehicle body. Moreover, the silencer outlet is provided in the front. Accordingly, exhaust gas flows unidirectionally from the rear toward the front in an internal space of the silencer, so that the direction of the flow of the exhaust gas inside the silencer can be prevented from being reversed as in the background-art technique. Thus, complication of the communication pipes inside the silencer can be avoided in comparison with the background-art technique. As a result, the internal structure of the silencer can be simplified and the communication pipes do not have to occupy a large volume of the internal space of the silencer. Accordingly, silencing performance can be enhanced without increasing the size of the silencer. Moreover, the communication pipes inside the silencer can be simplified to also reduce the weight of the silencer.

In the exhaust pipe structure for a vehicle, it is preferable that the exhaust pipe includes an outlet formation pipe which is connected to the silencer outlet and extends frontward, and a discharge pipe outlet in the exhaust pipe is formed by the outlet formation pipe. In the configuration, the exhaust pipe outlet can be arranged in front of the silencer. Thus, the flow of exhaust gas can be folded back to reciprocate once by the exhaust pipe and the silencer under the engine. The length of the exhaust gas flow through the exhaust pipe and the silencer can be secured without extending the exhaust pipe up to the side of the rear wheel. As a result, not only is it possible to improve rectification properties around the rear wheel during traveling and improve operability during driving, but it is also possible to contribute to improvement in aesthetic external appearance of the vehicle.

In the exhaust pipe structure for a vehicle, it may be that the exhaust pipe includes a front portion reversal pipe which is connected to the silencer outlet and by which the direction of the flow of the exhaust gas flowing frontward is reversed into a rearward direction, and an outlet formation pipe which is connected to a rear end side of the front portion reversal pipe and extends rearward; and an exhaust pipe outlet in the exhaust pipe is formed by the outlet formation pipe. In the configuration, the exhaust pipe extending from the silencer outlet can be made long due to the front portion reversal pipe and the outlet formation pipe. Torque of a normal rotation region can be increased to thereby improve operability. Moreover, the length of an exhaust stream can be further elongated without extending the exhaust pipe up to the side of the rear wheel while the flow of the exhaust gas is folded back to reciprocate one and a half times by the exhaust pipe and the silencer under the engine. Also in this manner, improvement in operability or aesthetic external appearance can be attained.

In the exhaust pipe structure for a vehicle, it is preferable that: the front portion reversal pipe extends frontward from the silencer outlet, and is then curved outward in a vehicle body width direction and made to face rearward; the exhaust pipe is disposed along a substantial S-shape in the bottom view of the vehicle body; and the silencer inlet and the silencer outlet are disposed on opposite sides with respect to a vehicle-width-direction center of the silencer. In the configuration, the silencer inlet and the silencer outlet can be set to have a positional relation in which they are offset from each other in the vehicle width direction. Accordingly, a large dimension in the vehicle width direction can be secured in each reversal pipe. Thus, the bending radius of each reversal pipe can be increased while the exhaust pipe is formed into a substantial S-shape as described above. Accordingly, exhaust resistance can be reduced to improve the output.

In the exhaust pipe structure for a vehicle, it is preferable that: the front portion reversal pipe extends frontward from the silencer outlet, and is then curved inward in a vehicle body width direction and made to face rearward; and the exhaust pipe is disposed along a substantial α-shape in the bottom view of the vehicle body. Also in the configuration, the dimension of each reversal portion in the vehicle width direction can be made large, so that exhaust resistance can be reduced to improve the output. Moreover, the silencer is not hidden by the exhaust pipe but can be exposed on an outer side of the vehicle body. Thus, the external appearance of the vehicle can be accentuated.

In the exhaust pipe structure for a vehicle, it is preferable that: the exhaust pipe further includes an upstream side formation pipe which extends along a front/rear direction, and a downstream end side of which is connected to the rear portion reversal pipe; and the upstream side formation pipe and the outlet formation pipe are arranged to be substantially parallel with each other and superimposed on each other in an up/down direction. In the configuration, the upstream side formation pipe and the outlet formation pipe can be placed side by side and disposed in a space adjacent to the silencer in the vehicle width direction so that the space can be used effectively. Further, the dimension occupied by the exhaust pipe in the vehicle width direction can be shortened so that an inclination angle of the vehicle can be gained. Accordingly, operability of the vehicle can be improved.

In the exhaust pipe structure for a vehicle, it is preferable that an exhaust pipe outlet in the exhaust pipe is made to face downward. In this configuration, noise emitted from the exhaust pipe first hits the ground to be thereby absorbed to some degree. Accordingly, exhaust noise can be hardly transmitted to a rider and the surroundings in comparison with the case in which the exhaust pipe outlet is disposed to face right beside or upward. Thus, comfortability can be improved. Further, foreign matter such as rain or mud can be prevented from easily entering the exhaust pipe through the exhaust pipe outlet.

In the exhaust pipe structure for a vehicle, it is preferable that: the exhaust pipe further includes an upstream side formation pipe which extends in a front/rear direction, and a downstream end side of which is connected to the rear portion reversal pipe; the silencer is positioned on one side of the upstream side formation pipe in a vehicle width direction in the bottom view of the vehicle body; and the silencer inlet is provided to be offset to the one side with respect to the vehicle-width-direction center position of the silencer. In this configuration, the silencer inlet is offset as described above. Accordingly, the bending radius of the rear portion reversal pipe extending to the silencer inlet can be made large so that exhaust resistance can be reduced to improve the output.

In the exhaust pipe structure for a vehicle, it is preferable that the silencer is provided so that at least a part of a rear wheel suspension device constituting the vehicle can be disposed at the rear of the silencer. In the configuration, the size of the silencer can be reduced in the front/rear direction to thereby produce a space at the rear of the silencer so that a part of the real wheel suspension device such as a link lever can be disposed in the produced space. Thus, the degree of freedom for setting a lever ratio in suspension of the rear wheel can be enhanced so that operability of the vehicle can be improved.

Advantageous Effects of Invention

According to the invention, the rear portion reversal pipe is used so that the silencer inlet of the silencer disposed under the engine can be disposed at the rear of the vehicle body and the silencer outlet can be disposed at the front of the vehicle body. Accordingly, the internal structure of the silencer can be simplified, and silencing performance can be improved while the increase of the size of the silencer is suppressed.

EMBODIMENTS FOR CARRYING OUT THE INVENTION

Embodiments of the invention will be described below in detail with reference to the accompanying drawings. Although an example in which an exhaust pipe structure according to the invention is applied to a motorcycle will be described below, the subject to which the exhaust pipe structure according to the invention is applied is not limited thereto but may be changed. For example, the exhaust pipe structure according to the invention may be applied to another buggy-type vehicle such as a motor tricycle or a four-wheeled motor vehicle. In addition, a direction toward the front of a vehicle body is designated by an arrow FR; a direction toward the rear of the vehicle body, an arrow RE; a direction toward a left side of the vehicle body, an arrow L; and a direction toward a right side of the vehicle body, an arrow R. Incidentally, in the following drawings, a partial configuration may be omitted for convenience of explanation.

(First Embodiment)

Figure 1:
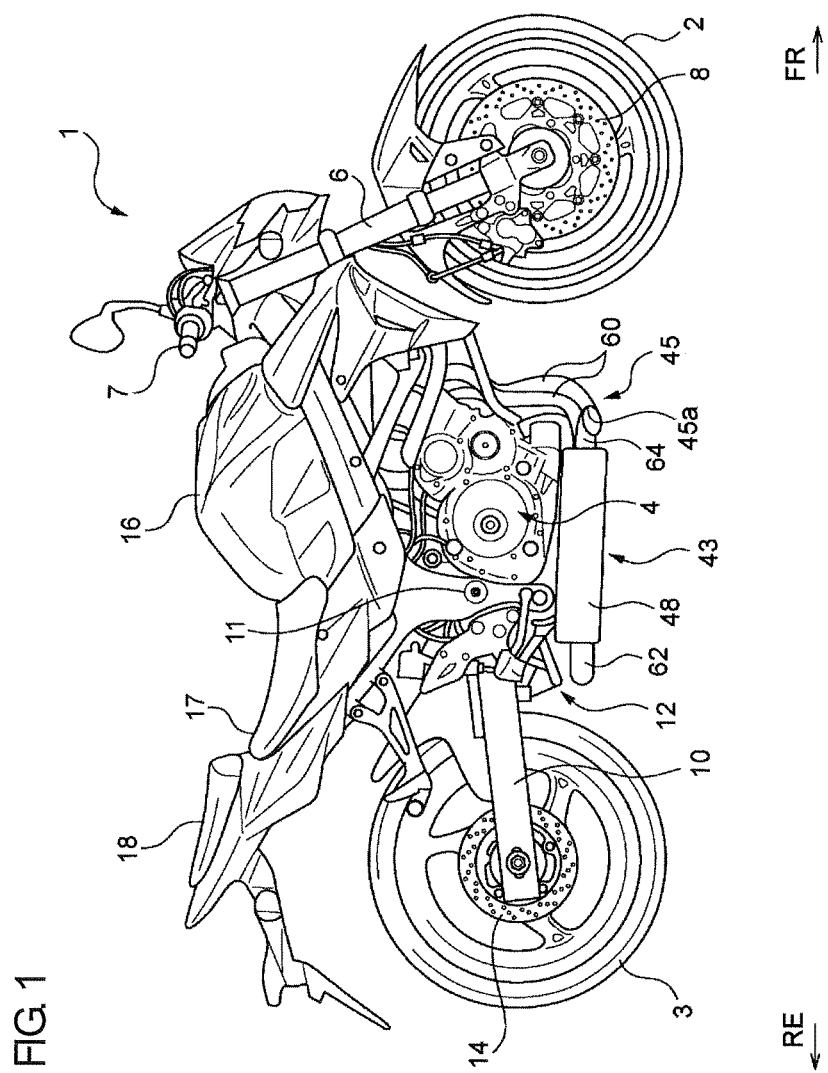
FIG. 1 An overall view of a motorcycle according to a first embodiment as seen from a right side of a vehicle body of the motorcycle.

First, an overall schematic configuration of a motorcycle according to a first embodiment will be described with reference to FIG. 1. FIG. 1 is a right side view of the motorcycle according to the first embodiment.

As shown in FIG. 1, the motorcycle 1 is provided with an engine 4 arranged between a front wheel 2 and a rear wheel 3. The front wheel 2 is supported through a front fork 6. The front fork 6 is connected to a head pipe 22 (see FIG. 2) of a vehicle body frame 20 rotatably. The vehicle body frame 20 will be described later. A handlebar (not shown) is provided on an upper end side of the front fork 6. Grips 7 are mounted on opposite end portions of the handlebar. In addition, a brake disk 8 is provided in the front wheel 2. Incidentally, the structure of the engine 4 will be described later.

The rear wheel 3 is supported through a swing arm 10. A front end side of the swing arm 10 is connected rotatably through a swing arm pivot 11. Due to this connection, a rear end side of the swing arm 10 can swing in an up/down direction. A rear wheel suspension device 12 is attached to the front end side of the swing arm 10. The structure of the rear wheel suspension device 12 will be described later. A brake disk 14 for use in the rear wheel 3 is provided in the rear wheel 3.

A fuel tank 16 is disposed above the engine 4. A rider seat 17 and a pillion seat 18 are arranged at the rear of the fuel tank 16. Various vehicle body covers are provided continuously to the bottoms of the respective seats 17 and 18 and the fuel tank 16. An exhaust pipe structure which discharges exhaust gas from the engine 4 is arranged in a region extending from the front side of the engine 4 to the lower side of the engine 4. Details of the exhaust pipe structure will be described later.

Figure 2:
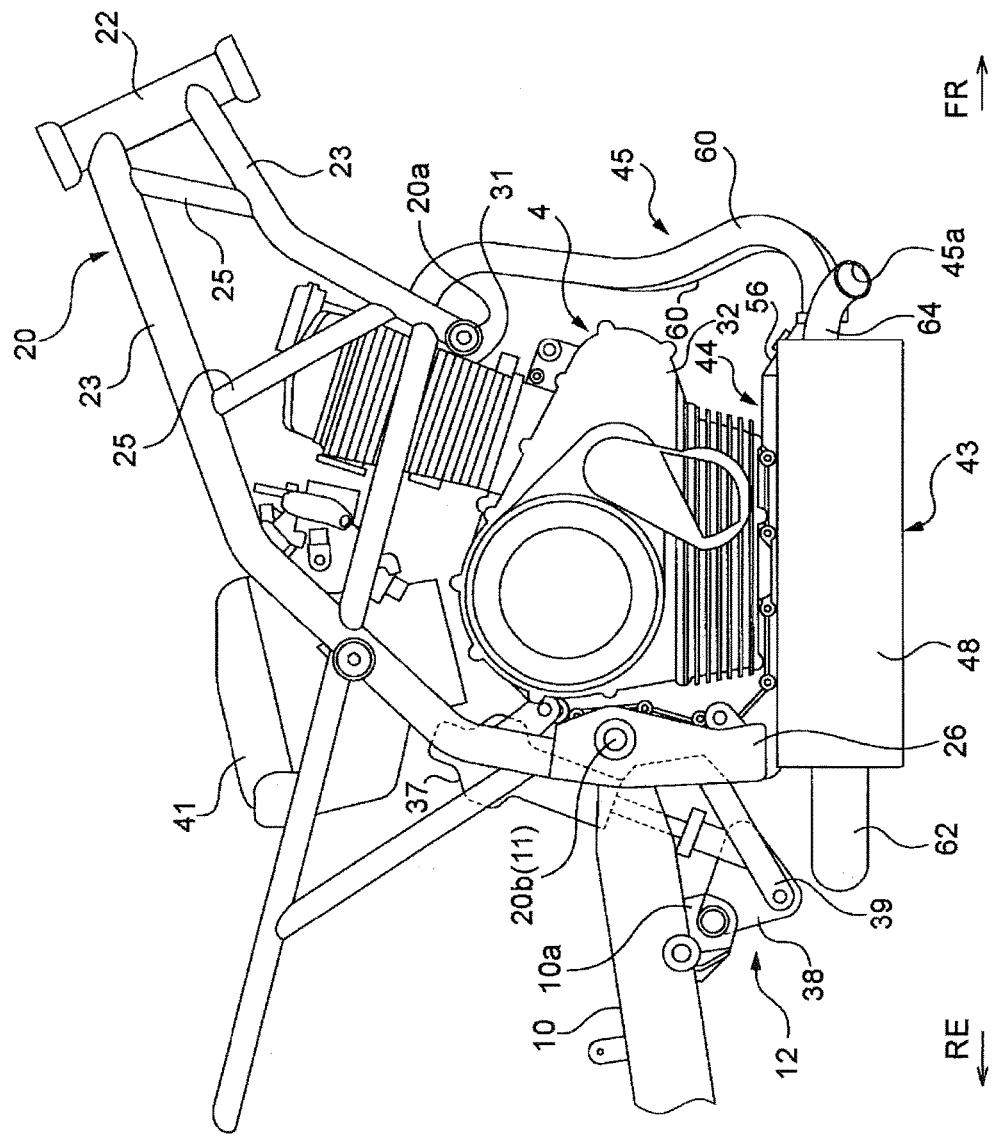
FIG. 2 A view of a partial configuration of the motorcycle according to the first embodiment as seen from the right side of the vehicle body.
Figure 3:
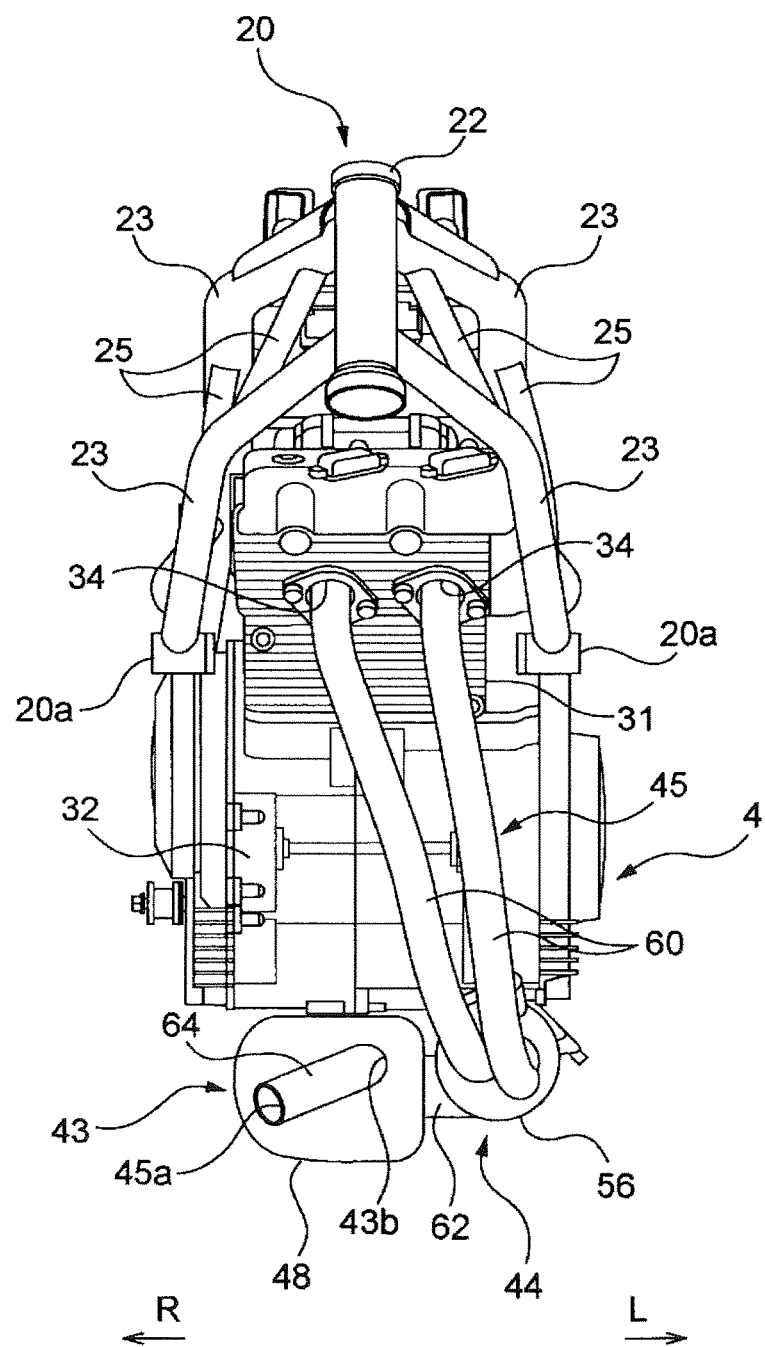
FIG. 3 A view of the partial configuration according to the first embodiment as seen from the front of the vehicle body.
Figure 4:
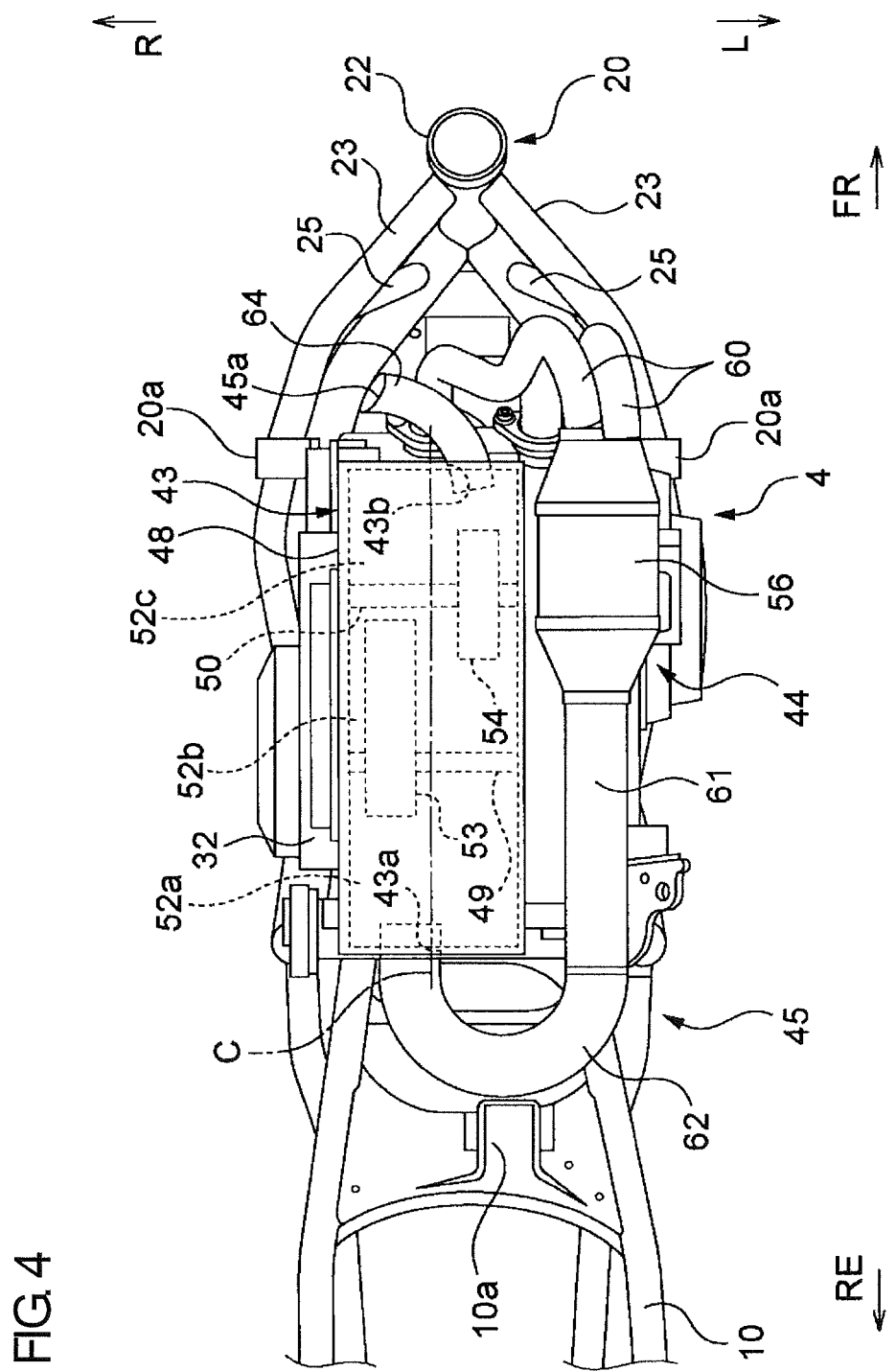
FIG. 4 A view of the partial configuration according to the first embodiment as seen from the bottom of the vehicle body.

Successively, the engine 4, the rear wheel suspension device 12, the exhaust pipe structure, and their peripheral structures will be described with reference to FIGS. 2 to 4. FIG. 2 is a view of a part of configuration of the motorcycle according to the embodiment as seen from the right side of the vehicle body. FIG. 3 is a view of the part as seen from the front of the vehicle body. FIG. 4 is a view of the part as seen from the bottom of the vehicle body.

As shown in FIG. 2, the engine 4 is suspended on the vehicle body frame 20 which is made of steel or an aluminum alloy and formed into a truss structure. The vehicle body frame 20 is provided with the head pipe 22, four main frames 23, a plurality of truss members 25, and an engine bracket 26. The head pipe 22 is disposed in front of the vehicle body. The four main frames 23 in total (see FIG. 3) are connected to the rear side of the head pipe 22 so as to be arranged on the upper, lower, left and right sides. The truss members 25 are provided between the main frames 23 which are placed on the upper and lower sides respectively. The engine bracket 26 is connected to rear end sides of the upper main frames 23. First suspension portions 20a are formed at lower ends of the main frames 23 located on the lower side. On the other hand, second suspension portions 20b are formed in the engine bracket 26. When these suspension portions 20a and 20b are fastened by bolts, the engine 4 is suspended. The second suspension portions 20b function also as the swing arm pivot 11 (see FIG. 1) by which the front end side of the swing arm 10 is supported rotatably.

The engine 4 is provided with a cylinder block 31 and a crankcase 32. The cylinder block 31 is suspended on the main frames 23 by the first suspension portions 20a. The crankcase 32 is suspended on the engine bracket 26 by the second suspension portions 20b. The engine 4 is provided as a two-cylinder engine in which two cylinders (not shown) are arrayed in a left/right direction inside the cylinder block 31. Two exhaust ports 34 (see FIG. 3) are arrayed in the left/right direction in accordance with the cylinders on a front surface side of the cylinder block 31. In the embodiment, the cylinder block 31 which is inclined frontward is connected to an upper side of the crankcase 32.

In FIG. 2, the rear wheel suspension device 12 which is disposed at the rear of the engine 4 is provided with a link lever 38 and a rod 39 in addition to a rear cushion unit 37 for cushioning the rear wheel. The rear cushion unit 37 is provided as one unit in a left/right-direction center position of the vehicle body and located adjacently to the rear of the engine 4. In addition, the rear cushion unit 37 is disposed in a direction to be inclined frontward with respect to the up/down direction. An upper end portion of the rear cushion unit 37 is supported on the upper main frames 23 through a bracket (not shown). A lower end portion of the rear cushion unit 37 is supported on a front end side of the link lever 38. A rear end side of the link lever 38 is supported by a support portion 10a formed protrusively from a lower surface of the swing arm 10. A rear end portion of the rod 39 is supported on a lower end side of the link lever 38. A front end portion of the rod 39 is supported by the engine bracket 26. A lowermost portion of the rear wheel suspension device 12 is constituted by a lower region of the link lever 38 or the rod 39. Incidentally, an air cleaner 41 is retained by the main frames 23 above the engine 4.

As shown in FIG. 4, the exhaust pipe structure provided around the engine 4 is provided with a silencer (silencer) 43, a catalyst device 44, and an exhaust pipe 45. The silencer 43 and the catalyst device 44 are disposed under the engine 4. The exhaust pipe 45 is connected to the engine 4.

The silencer 43 is provided with a cylindrical body 48 extending in a front/rear direction. The cylindrical body 48 is retained on the bottom side of the engine 4 through a not-shown retention structure. A silencer inlet 43a for introducing exhaust gas from the exhaust pipe 45 is provided at the rear of the cylindrical body 48. On the other hand, a silencer outlet 43b for discharging exhaust gas is provided at the front of the cylindrical body 48. A first partition plate 49 and a second partition plate 50 are provided inside the cylindrical body 48. Thus, the inside of the cylindrical body 48 is divided into three expansion chambers (a rear expansion chamber 52a, a center expansion chamber 52b and a front expansion chamber 52c) in a longitudinal direction (the front/rear direction). While the silencer inlet 43a is formed in the rear expansion chamber 52a, the silencer outlet 43b is formed in the front expansion chamber 52c.

A first communication pipe 53 for making communication between the rear expansion chamber 52a and the center expansion chamber 52b is provided in the first partition plate 49. A second communication pipe 54 for making communication between the center expansion chamber 52b and the front expansion chamber 52c is provided in the second partition plate 50. With respect to a left/right-direction (vehicle width direction) center position C of the cylindrical body 48, the silencer inlet 43a and the first communication pipe 53 are disposed on the right side, and the silencer outlet 43b and the second communication pipe 54 are disposed on the left side. Accordingly, with respect to the center position C, established is a positional relation in which the silencer outlet 43a and the first communication pipe 53 are offset to the right side and the silencer outlet 43b and the second communication pipe 54 are offset to the left side which is the opposite side to the right side. In the center expansion chamber 52b, a front end of the first communication pipe 53 is disposed ahead of a rear end of the second communication pipe 54.

As shown in FIG. 2, an upper end of the cylindrical body 48 in the silencer 43 is positioned above the lowermost portion of the rear wheel suspension device 12 in the side view of the vehicle body. Accordingly, the lower region of the link lever 38 or the rod 39 which serves as at least a part of the rear wheel suspension device 12 is disposed at the rear of the silencer 43. Thus, a lower portion region of the rear wheel suspension device 12 is positioned at the rear of the cylindrical body 48 so as to be placed side by side therewith in the side view of the vehicle body.

As shown in FIG. 4, the catalyst device 44 is disposed adjacently to the left side of a front half part of the silencer 43 under the engine 4. The catalyst device 44 is provided with a cylindrical catalyst container 56 which is formed into a taper shape on its opposite front and rear sides and extends in the front/rear direction. A catalyst (not shown) for purifying exhaust gas is disposed inside the catalyst container 56. In the catalyst device 44, a front end portion and a rear end portion of the catalyst container 56 are used as an exhaust gas inlet and an exhaust gas outlet respectively.

The exhaust pipe 45 is provided with two front portion formation pipes 60 which are connected to the exhaust ports 34 of the cylinder block 31 and extend downward while meandering in front of the engine 4. Downstream end (lower end) sides of the two front portion formation pipes 60 are connected to the inlet of the catalyst device 44. Exhaust gas from the respective front portion formation pipes 60 is collected in the catalyst device 44.

The exhaust pipe 45 further includes an upstream side formation pipe 61 and a rear portion reversal pipe 62. The upstream side formation pipe 61 extends linearly in the front/rear direction from the outlet of the catalyst device 44. The rear portion reversal pipe 62 is connected to a downstream end (rear end) of the upstream side formation pipe 61. The upstream side formation pipe 61 is disposed on the left side of the silencer 43 in the bottom view of the vehicle body. In other words, the silencer 43 is positioned on the right side of the upstream side formation pipe 61, which is either one of the sides in the vehicle width direction.

The rear portion reversal pipe 62 is formed and curved into a semicircular arc shape in the bottom view of the vehicle body. Curved opposite end portions of the rear portion reversal pipe 62 in an extension direction are made to face frontward. An upstream side formation pipe 61 side of the rear portion reversal pipe 62 is set as an upstream end. A downstream end side of the rear portion reversal pipe 62 is connected to the silencer inlet 43a. The direction of exhaust gas flowing rearward in the upstream side formation pipe 61 is reversed into a frontward direction by the rear portion reversal pipe 62.

The exhaust pipe 45 further includes an outlet formation pipe 64 connected to the silencer outlet 43b. As shown in FIGS. 2 to 4, the outlet formation pipe 64 extends in a direction to be inclined to a lower right side as it goes toward the front from the silencer outlet 43b. An exhaust pipe outlet 45a is formed in a downstream end (front end) of the outlet formation pipe 64. The exhaust pipe outlet 45a is opened to face outward in the vehicle width direction and downward. Exhaust gas flowing through the outlet formation pipe 64 is discharged toward a road surface side outside the vehicle body from the exhaust pipe outlet 45a. Thus, exhaust noise emitted from the exhaust pipe 45 can be absorbed by the road surface so that propagation of the exhaust noise toward a rider or the surroundings can be suppressed. Thus, the environment can be made comfortable. Moreover, since the exhaust pipe outlet 45a faces downward, foreign matter such as rain or mud can be prevented from entering the exhaust pipe outlet 45a.

Next, the flow of exhaust gas generated in the engine 4 in the exhaust pipe structure according to the embodiment will be described. The exhaust gas generated in the engine 4 is discharged from the discharge ports 34 to the two front portion formation pipes 60. The exhaust gas passes through the front portion formation pipes 60. Then, the exhaust gas is introduced into the catalyst device 44 to be thereby purified. The exhaust gas purified by the catalyst device 44 flows linearly into the upstream side formation pipe 61 to move rearward. Then, the exhaust gas is reversed into a frontward direction by the rear portion reversal pipe 62 and introduced into the silencer 43.

The exhaust gas introduced into the silencer 43 flows into the rear expansion chamber 52a, the center expansion chamber 52b and the front expansion chamber 52c sequentially from the rear toward the front through the first and second communication pipes 53 and 54. On this occasion, the exhaust gas is expanded whenever it enters the expansion chambers 52a to 52c. Due to the expansion, exhaust noise can be attenuated and made silent. The exhaust gas flowing into the silencer 43 passes through the outlet formation pipe 64 and is discharged from the exhaust pipe outlet 45a.

In the exhaust pipe structure according to the embodiment as described above, the silencer inlet 43a is provided in the rear. Accordingly, even when the silencer 43 is disposed under the engine 4, the front portion formation pipes 60 and the upstream side formation pipe 61 extending from the exhaust ports 34 of the engine 4 up to the silencer 43 can be secured to be long. Thus, the degree of freedom for the shape or layout of the front portion formation pipes 60 etc. can be enhanced so that output characteristics can be improved.

Moreover, the silencer inlet 43a is provided in the rear and the silencer outlet 43b is provided in the front. Therefore, exhaust gas flows inside the silencer 43 unidirectionally from the rear toward the front. Accordingly, in comparison with the background-art structure in which both the silencer inlet and the silencer outlet are provided in the rear, the flow of exhaust gas is not reversed inside the silencer 43 so that the configuration of each of the communication pipes 53 and 54 can be simplified and made shorter and lighter. As a result, the volume occupied by the respective communication pipes 53 and 54 in the internal space of the silencer 43 can be reduced so that silencing performance can be enhanced while the size of the silencer 43 is suppressed.

Further, the size of the silencer 43 may be reduced while the silencing performance is maintained. The length of the silencer 43 in the front/rear direction can be reduced due to the reduction of the size, so that a large space in which a partial configuration of the rear wheel suspension device 12 can be disposed can be secured at the rear of the silencer 43. Thus, the degree of freedom for setting a lever ratio, such as for changing the length of the rear cushion unit 37 or the rod 39 constituting the rear wheel suspension device 12 can be enhanced.

In addition, since the exhaust pipe outlet 45*a* is formed in front of the silencer 43, the flow of the exhaust gas can be folded back to reciprocate once by the upstream side formation pipe 61, the rear portion reversal pipe 62, the silencer 43 and the outlet formation pipe 64. Thus, the exhaust pipe length can be secured without extending the exhaust pipe 45 up to the side of the rear wheel 3. Rectification properties around the rear wheel 3 during traveling can be improved so that driving operability can be improved. In addition thereto, external appearance of the vehicle can be made beautiful.

Not only the position of the silencer 43 with respect to the upstream side formation pipe 61 but also the position of the silencer inlet 43*a* with respect to the widthwise center position C of the cylindrical body 48 are located on the right side. Accordingly, the width of the rear portion reversal pipe 62 in the left/right direction can be increased so that the bending radius of the rear portion reversal pipe 62 can be increased. Thus, exhaust resistance of the rear portion reversal pipe 62 can be reduced so that the output of the engine 4 can be improved.

Successively, a second embodiment and a third embodiment which are different from the first embodiment will be described. Incidentally, in the second and third embodiments, constituent elements common with those in the first embodiment will be referred to by the same numerals or signs respectively and description thereof will be omitted.
(Second Embodiment)

Figure 5:
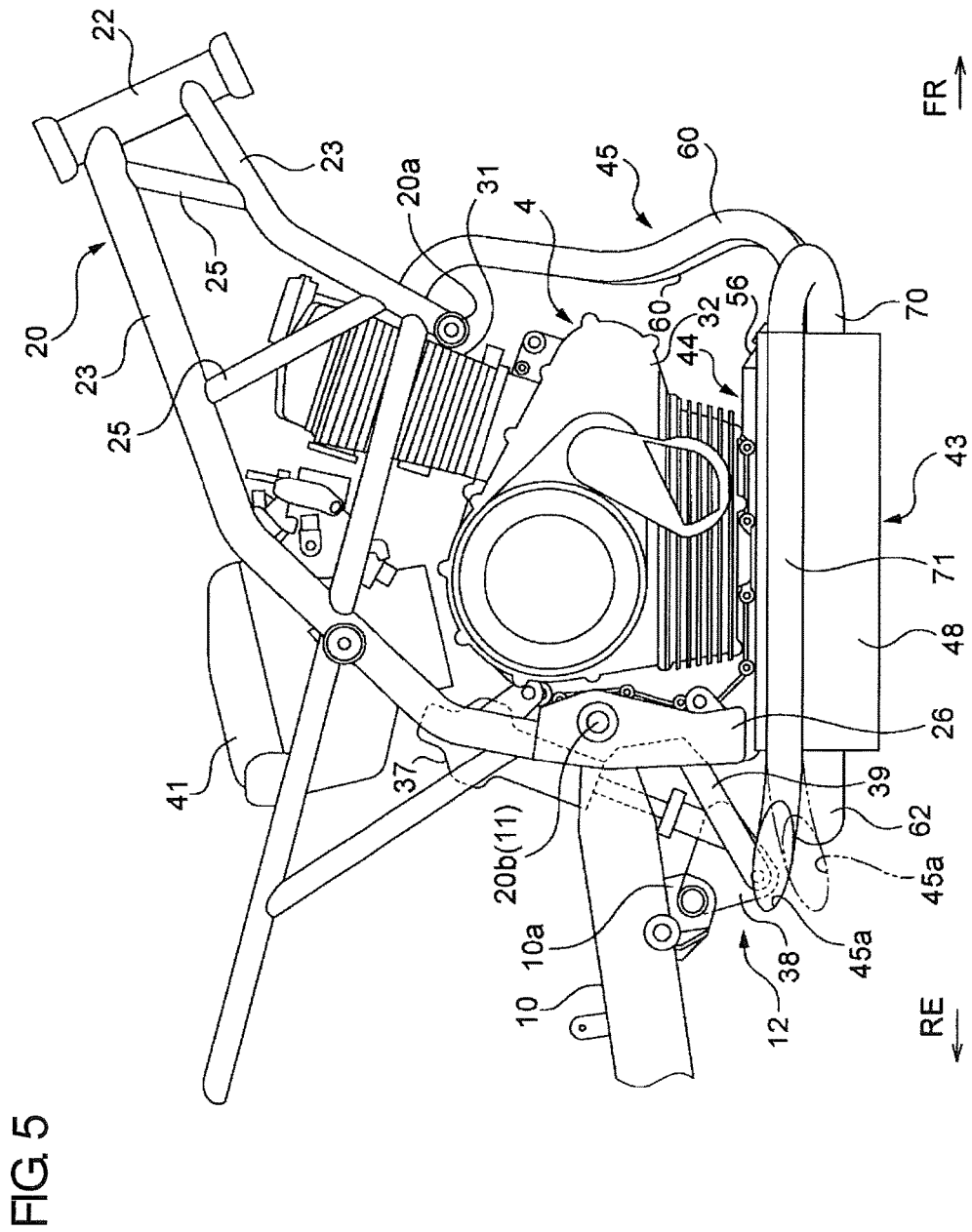
FIG. 5 A view of a partial configuration of a motorcycle according to a second embodiment as seen from a right side of a vehicle body of the motorcycle.
Figure 6:
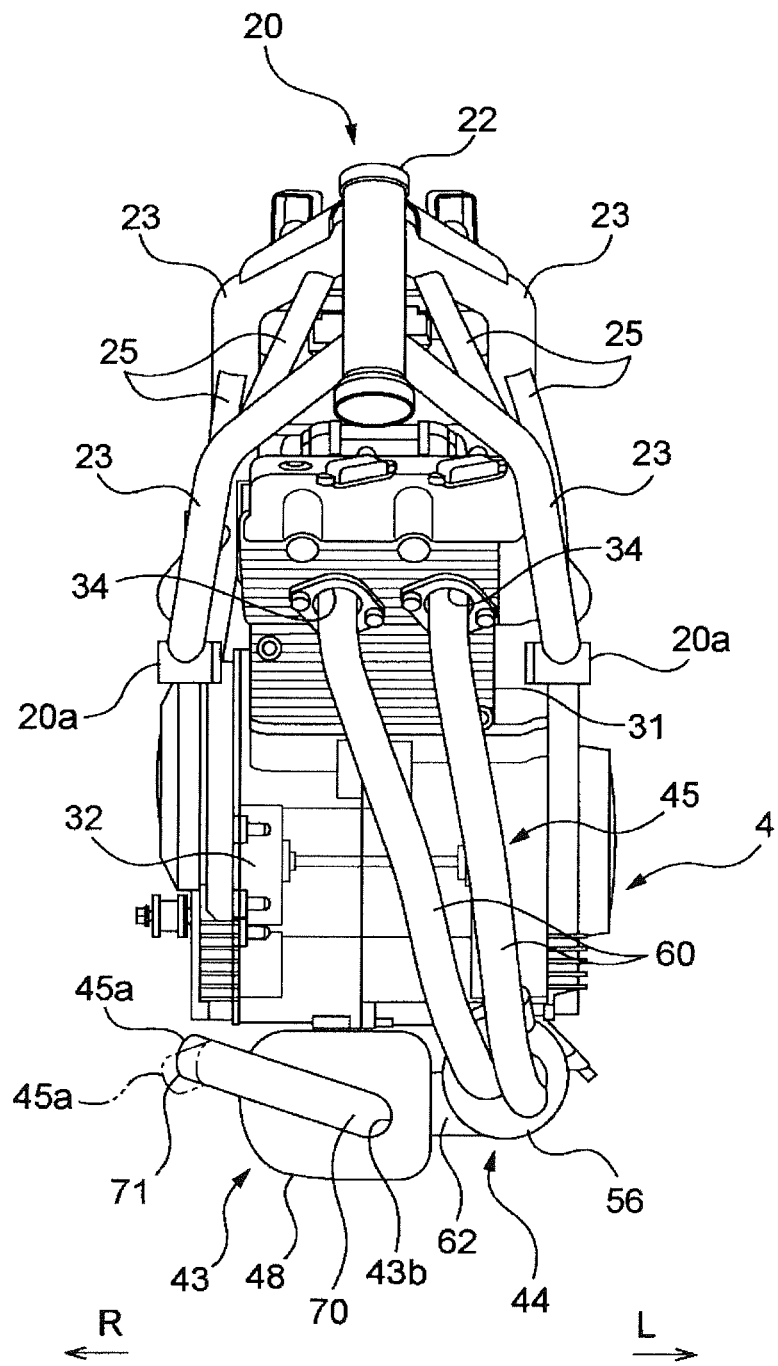
FIG. 6 A view of the partial configuration according to the second embodiment as seen from the front of the vehicle body.
Figure 7:
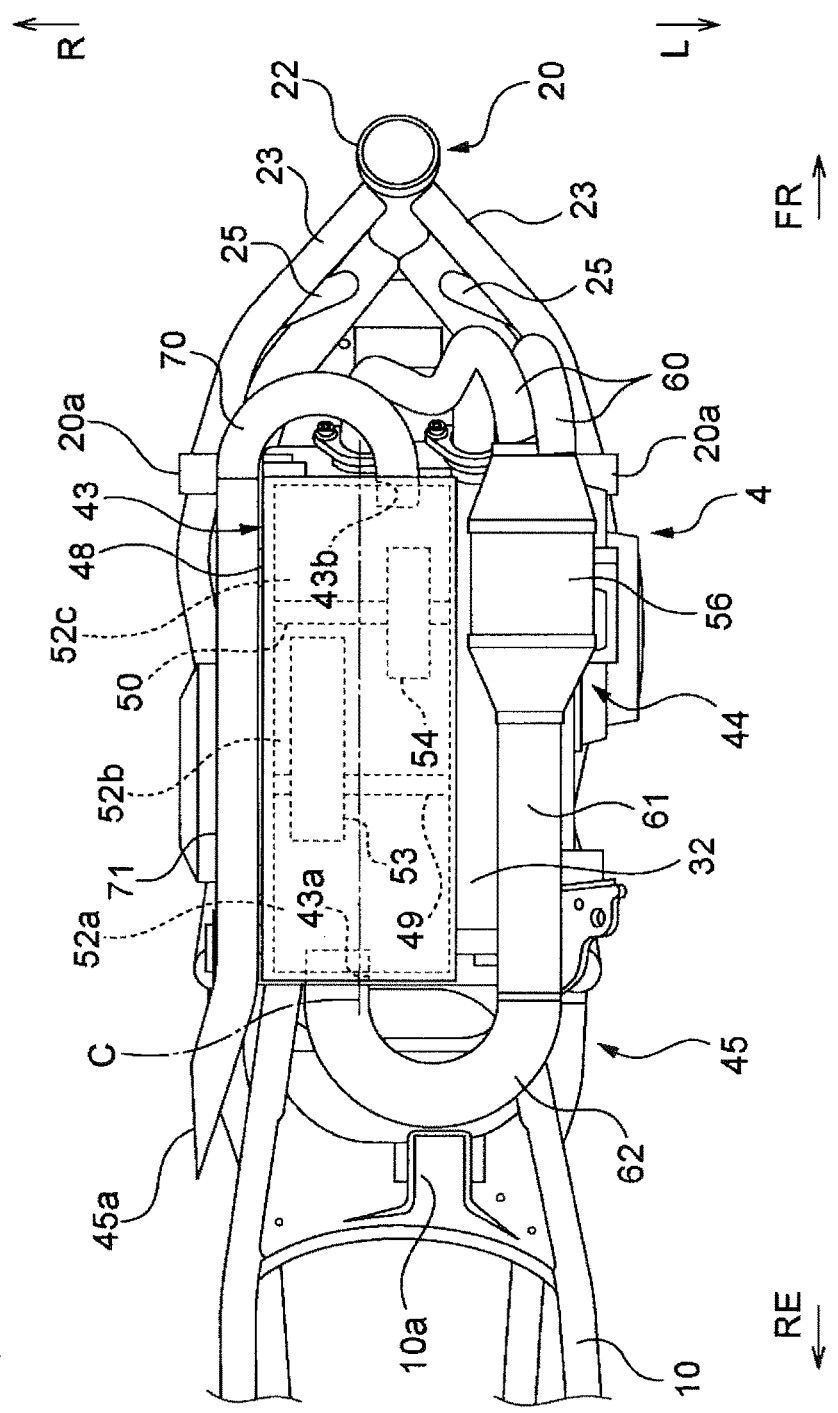
FIG. 7 A view of the partial configuration according to the second embodiment as seen from the bottom of the vehicle body.

The second embodiment will be described below. FIG. 5 is a view of a part of configuration of a motorcycle according to the second embodiment as seen from a right side of a vehicle body of the motorcycle. FIG. 6 is a view of the part as seen from the front of the vehicle body. FIG. 7 is a view of the part as seen from the bottom of the vehicle body.

As shown in FIGS. 5 to 7, an exhaust pipe 45 according to the second embodiment has a front portion reversal pipe 70. An upstream end side of the front portion reversal pipe 70 is connected to a silencer outlet 43*b*. The front portion reversal pipe 70 is formed and curved into a semicircular arc shape in the bottom view of the vehicle body as follows. That is, the front portion reversal pipe 70 extends frontward from the silencer outlet 43*b*, and is then curved outward in a vehicle body width direction and made to face rearward. While a silencer outlet 43*b* side of the front portion reversal pipe 70 is set as an upstream end, an opposite end of the front portion reversal pipe 70 to the upstream end is set as a downstream end. The direction of exhaust gas flowing frontward at the silencer outlet 43*b* is reversed into a rearward direction by the front portion reversal pipe 70.

The exhaust pipe 45 according to the embodiment further has an outlet formation pipe 71 extending in a front/rear direction. The outlet formation pipe 71 is connected to the downstream end side of the front portion reversal pipe 70 and extends rearward so that the length of the exhaust pipe extending from the silencer outlet 43*b* can be extended in comparison with the first embodiment. Torque of a normal rotation region in an engine 4 can be increased due to the extension of the length, so that operability of the vehicle can be improved. An exhaust pipe outlet 45*a* through which exhaust gas is discharged is formed at a downstream end (rear end) of the outlet formation pipe 71. The exhaust pipe outlet 45*a* according to the embodiment faces outward in the vehicle width direction and is opened along a vertical plane. Incidentally, the exhaust pipe outlet 45*a* may be opened to face downward, as designated by a two-dot chain line in FIGS. 5 and 6.

An upstream side formation pipe 61, a rear portion reversal pipe 62, the front portion reversal pipe 70 and the outlet formation pipe 71 in the exhaust pipe 45 are disposed substantially along a reversed S-shape in the bottom view of the vehicle body. The flow of exhaust gas can be folded back to reciprocate one and a half times by these pipes 61, 62, 70 and 71 and a silencer 43 under the engine 4. In addition, also in the silencer 43 according to the embodiment, a silencer inlet 43*a* is offset to the right side and the silencer outlet 43*b* is offset to the left side with respect to a left/right-direction center position C of a cylindrical body 48 in the same manner as in the first embodiment. The silencer inlet 43*a* and the silencer outlet 43*b* are disposed on the opposite sides with respect to the center position C. Thus, the width of the rear portion reversal pipe 62 and the width of the front portion reversal pipe 70 in the left/right direction can be increased. The bending radius of the arc portion of the S-shape can be increased. Accordingly, exhaust resistance of the exhaust gas flowing through the rear portion reversal pipe 62 and the front portion reversal pipe 70 can be reduced so that the output of the engine 4 can be improved.
(Third Embodiment)

Figure 8:
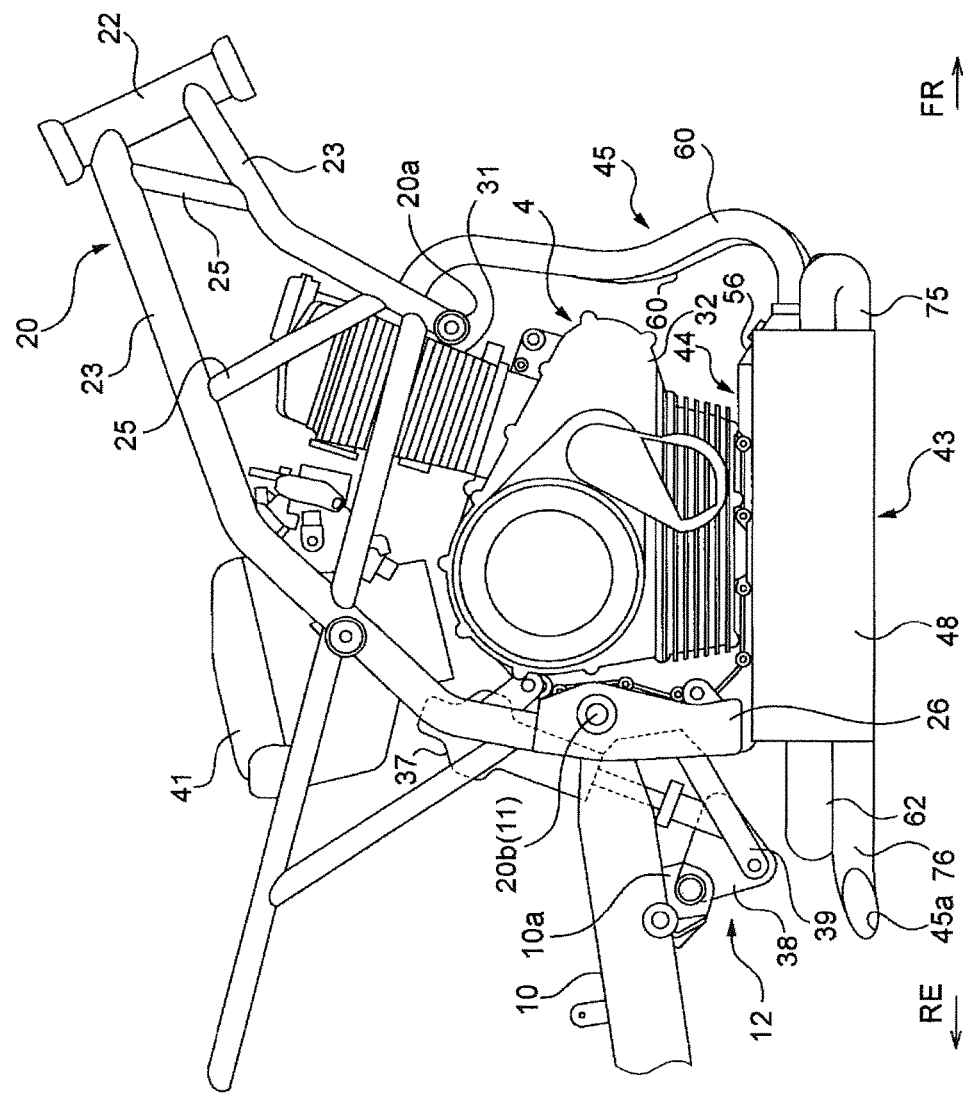
FIG. 8 A view of a partial configuration of a motorcycle according to a third embodiment as seen from a right side of a vehicle body of the motorcycle.
Figure 9:
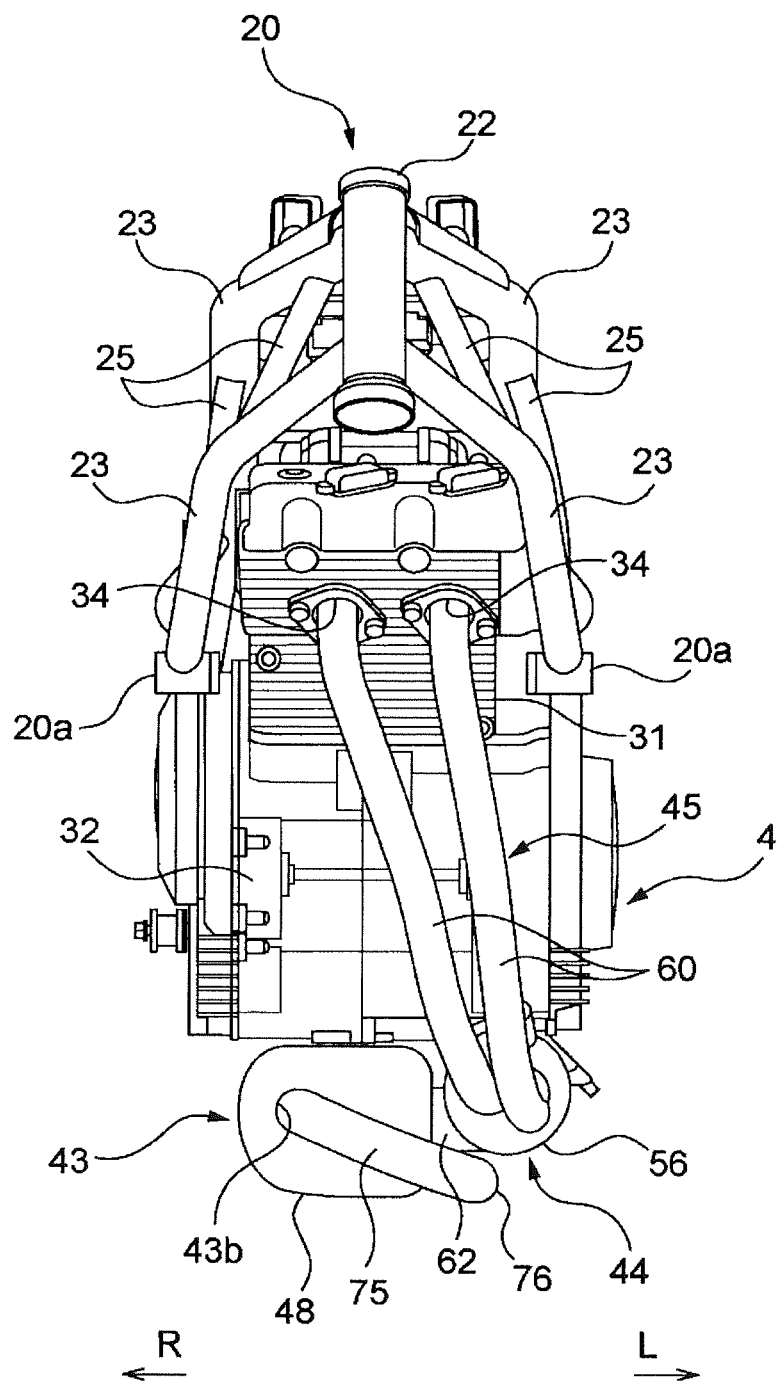
FIG. 9 A view of the partial configuration according to the third embodiment as seen from the front of the vehicle body.
Figure 10:
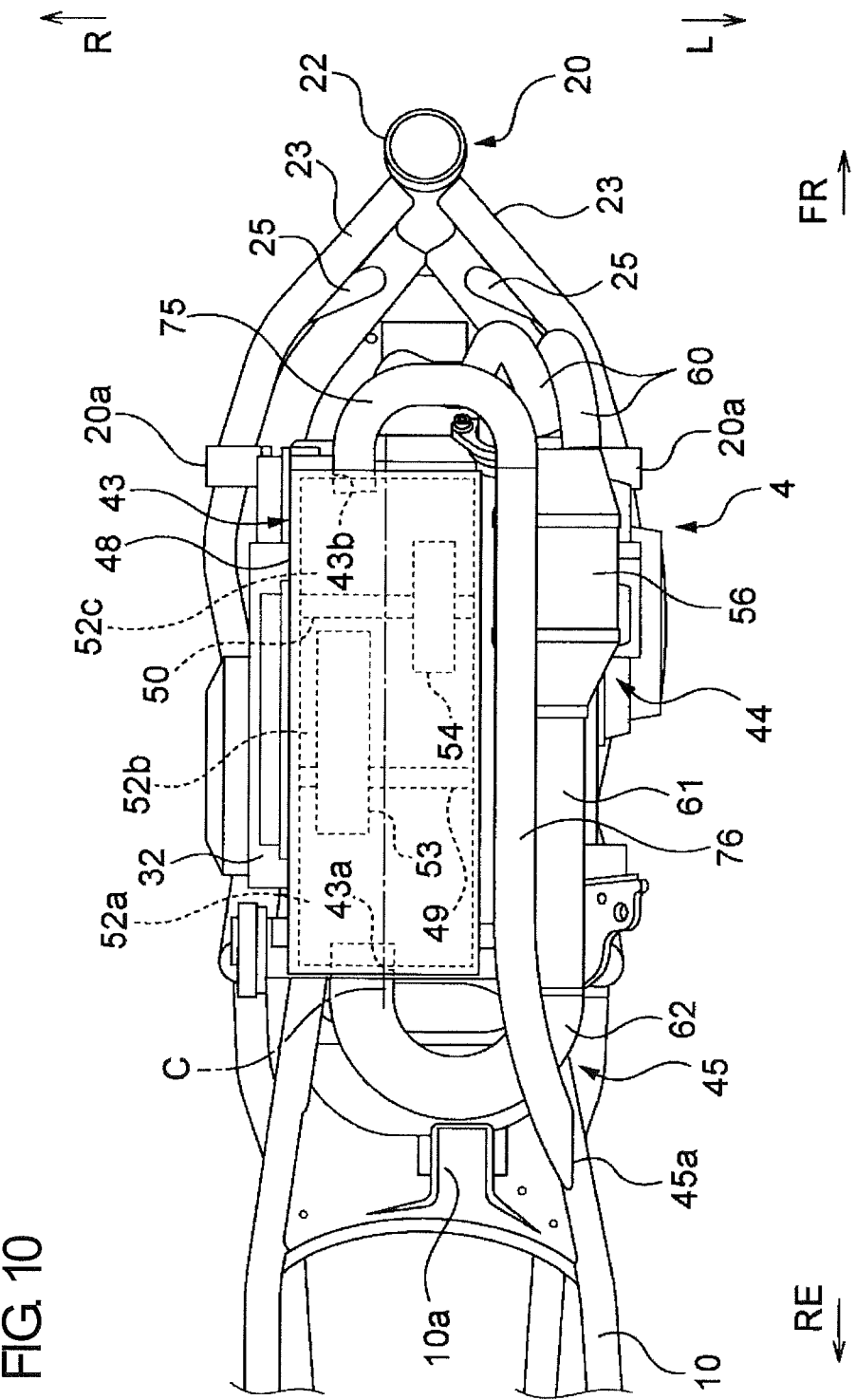
FIG. 10 A view of the partial configuration according to the third embodiment as seen from the bottom of the vehicle body.

The third embodiment will be described below. FIG. 8 is a view of a part of configuration of a motorcycle according to the third embodiment as seen from a right side of a vehicle body of the motorcycle. FIG. 9 is a view of the part as seen from the front of the vehicle body. FIG. 10 is a view of the part as seen from the bottom of the vehicle body.

As shown in FIGS. 8 to 10, an exhaust pipe 45 according to the third embodiment has a front portion reversal pipe 75. An upstream end side of the front portion reversal pipe 75 is connected to a silencer outlet 43*b*. The front portion reversal pipe 75 is formed and curved into a semicircular arc shape in the bottom view of the vehicle body as follows. That is, the front portion reversal pipe 75 extends frontward from the silencer outlet 43*b*, and is then curved inward (toward a left side) in a vehicle body width direction and made to face rearward. While a silencer outlet 43*b* side of the front portion reversal pipe 70 is set as an upstream end, an opposite side of the front portion reversal pipe 70 to the upstream end is set as a downstream end. The direction of exhaust gas flowing frontward at the silencer outlet 43*b* is reversed into a rearward direction.

The exhaust pipe 45 according to the embodiment further has an outlet formation pipe 76 extending in a front/rear direction. The outlet formation pipe 76 is connected to the downstream end side of the rear portion reversal pipe 75 and extends rearward. An exhaust pipe outlet 45*a* through which exhaust gas is discharged is formed at a downstream end (rear end) of the outlet formation pipe 76. The outlet formation pipe 76 is disposed under a catalyst device 44 and an upstream side formation pipe 61 and arranged to be substantially parallel with the upstream side formation pipe 61 and superimposed on the upstream side formation pipe 61 in an up/down direction. Thus, a silencer 43 is not hidden by the outlet formation pipe 76 but can be exposed in the outer side so that design of the external appearance can be improved due to the silencer 43. In addition, the outlet formation pipe 76 and the upstream side formation pipe 61 can be placed side by side in the up/down direction and disposed in a space on a left side of the silencer 43 so that the space can be used effectively. Moreover, a vehicle-width-direction dimension occupied by the outlet formation pipe 76 and the upstream side formation pipe 61 can be reduced so that an inclination angle of the vehicle can be gained.

The upstream side formation pipe 61, a rear portion reversal pipe 62, the front portion reversal pipe 75, and the outlet formation pipe 76 in the exhaust pipe 45 are disposed along a shape in which a substantial a shape is rotated by 90° clockwise in the bottom view of the vehicle body. The flow of exhaust gas can be folded back to reciprocate one and a half times by these pipes 61, 62, 75 and 76 and the silencer 43 under the engine 4. In addition, both a silencer inlet 43a and the silencer outlet 43b are disposed on the right side with respect to a left/right-direction center position C of a cylindrical body 48 in the silencer 43 according to the embodiment. Thus, the width of the rear portion reversal pipe 62 and the width of the front portion reversal pipe 75 in the left/right direction can be increased. The bending radius of the circular arc portion of the α-shape can be increased. Thus, exhaust resistance of exhaust gas flowing through the rear portion reversal pipe 62 and the front portion reversal pipe 75 can be reduced so that the output of the engine 4 can be improved.

The invention is not limited to the aforementioned embodiments, but may be carried out with various changes made thereon. In the aforementioned embodiments, the sizes, shapes, etc. illustrated in the accompanying drawings are not limited to the aforementioned ones but may be changed suitably within the scope in which advantageous effects of the invention can be attained. In addition thereto, the invention can be carried out with any other suitable change made thereon without departing from the scope of the object of the invention.

For example, in each of the aforementioned embodiments, the extension shape, the extension direction, etc. of the exhaust pipe 45 may be changed as long as an effect equivalent to or higher than that in each of the embodiments can be obtained. For example, the upstream side formation pipe 61 or the outlet formation pipe 71 or 76 may extend in a direction to be inclined to the left/right direction or the up/down direction with respect to the front/rear direction or may be formed into a partially curved shape.

In addition, the internal structure of the silencer 43 may be changed variously. The number of the communication pipes 53 and 54 or the partition plates 49 and 50 to be installed, or the layout thereof may be changed in accordance with silencing performance etc.

INDUSTRIAL APPLICABILITY

As described above, the invention has an effect that the internal structure of the silencer can be simplified, the size of the silencer can be reduced and the silencing performance can be improved. Thus, the invention is useful for an exhaust pipe structure in which a silencer is disposed under an engine.

The present application is based on a Japanese Patent Application No. 2014-110275 which was filed on May 28, 2014 and Contents of which are all included here in advance.

The invention claimed is:
1. An exhaust pipe structure for a vehicle, comprising: an exhaust pipe which is connected to an engine; and a silencer which is connected to the exhaust pipe and disposed under the engine, wherein:
   a silencer inlet through which exhaust gas is introduced into the silencer is provided in the silencer and at rear of a vehicle body;
   the exhaust pipe has a rear portion reversal pipe by which a direction of a flow of exhaust gas flowing rearward is reversed into a frontward direction, the exhaust pipe being connected to the silencer inlet at a downstream end side of the rear portion reversal pipe; and
   a silencer outlet through which exhaust gas is discharged from the silencer is provided in the silencer and at front of the vehicle body.
2. The exhaust pipe structure for a vehicle according to claim 1, wherein the exhaust pipe comprises an outlet formation pipe which is connected to the silencer outlet and extends frontward, and a discharge pipe outlet in the exhaust pipe is formed by the outlet formation pipe.
3. The exhaust pipe structure for a vehicle according to claim 1, wherein the exhaust pipe comprises a front portion reversal pipe which is connected to the silencer outlet and by which the direction of the flow of the exhaust gas flowing frontward is reversed into a rearward direction, and an outlet formation pipe which is connected to a rear end side of the front portion reversal pipe and extends rearward; and an exhaust pipe outlet in the exhaust pipe is formed by the outlet formation pipe.
4. The exhaust pipe structure for a vehicle according to claim 3, wherein:
   the front portion reversal pipe extends frontward from the silencer outlet, and is then curved outward in a vehicle body width direction and made to face rearward;
   the exhaust pipe is disposed along a substantial S-shape in a bottom view of the vehicle body; and
   the silencer inlet and the silencer outlet are disposed on opposite sides with respect to a vehicle-width-direction center of the silencer.
5. The exhaust pipe structure for a vehicle according to claim 3, wherein:
   the front portion reversal pipe extends frontward from the silencer outlet, and is then curved inward in a vehicle body width direction and made to face rearward; and
   the exhaust pipe is disposed along a substantial α-shape in a bottom view of the vehicle body.
6. The exhaust pipe structure for a vehicle according to claim 5, wherein:
   the exhaust pipe further comprises an upstream side formation pipe which extends along a front/rear direction, and a downstream end side of which is connected to the rear portion reversal pipe; and
   the upstream side formation pipe and the outlet formation pipe are arranged to be substantially parallel with each other and superimposed on each other in an up/down direction.
7. The exhaust pipe structure for a vehicle according to claim 1, wherein an exhaust pipe outlet in the exhaust pipe is made to face downward.

8. The exhaust pipe structure for a vehicle according to claim 1, wherein:
- the exhaust pipe further comprises an upstream side formation pipe which extends in a front/rear direction, and a downstream end side of which is connected to the rear portion reversal pipe;
- the silencer is positioned on one side of the upstream side formation pipe in a vehicle width direction in the bottom view of the vehicle body; and
- the silencer inlet is provided to be offset to the one side with respect to the vehicle-width-direction center position of the silencer.

9. The exhaust pipe structure for a vehicle according to claim 1, wherein the silencer is provided so that at least a part of a rear wheel suspension device constituting the vehicle can be disposed at the rear of the silencer.

10. The exhaust pipe structure for a vehicle according to claim 2, wherein an exhaust pipe outlet in the exhaust pipe is made to face downward.

11. The exhaust pipe structure for a vehicle according to claim 3, wherein an exhaust pipe outlet in the exhaust pipe is made to face downward.

12. The exhaust pipe structure for a vehicle according to claim 4, wherein an exhaust pipe outlet in the exhaust pipe is made to face downward.

13. The exhaust pipe structure for a vehicle according to claim 5, wherein an exhaust pipe outlet in the exhaust pipe is made to face downward.

14. The exhaust pipe structure for a vehicle according to claim 6, wherein an exhaust pipe outlet in the exhaust pipe is made to face downward.

\* \* \* \* \*